(12) United States Patent
Biscoglio

(10) Patent No.: US 9,587,084 B2
(45) Date of Patent: *Mar. 7, 2017

(54) HALOGENATED FLAME RETARDANT SYSTEMS FOR USE IN PRESENCE OF SILANE GRAFTING PROCESS

(71) Applicant: Union Carbide Chemicals & Plastics Technology LLC, Midland, MI (US)

(72) Inventor: Michael B. Biscoglio, Piscataway, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/733,037

(22) Filed: Jun. 8, 2015

(65) Prior Publication Data

US 2015/0267034 A1 Sep. 24, 2015

Related U.S. Application Data

(63) Continuation of application No. 13/698,887, filed as application No. PCT/US2011/036057 on May 11, 2011, now Pat. No. 9,228,131.

(60) Provisional application No. 61/352,545, filed on Jun. 8, 2010.

(51) Int. Cl.

| C08K 5/03 | (2006.01) |
|---|---|
| C08K 3/04 | (2006.01) |
| C08K 5/3492 | (2006.01) |
| C08K 3/22 | (2006.01) |
| C08K 5/54 | (2006.01) |
| C08K 5/14 | (2006.01) |
| C08K 5/5425 | (2006.01) |

(52) U.S. Cl.
CPC .............. *C08K 5/03* (2013.01); *C08K 3/04* (2013.01); *C08K 3/2279* (2013.01); *C08K 5/14* (2013.01); *C08K 5/3492* (2013.01); *C08K 5/5403* (2013.01); *C08K 5/5425* (2013.01)

(58) Field of Classification Search
CPC ........ C08F 255/02; C08F 230/08; C08K 5/03; C08K 3/04; C08K 5/3492; C08K 5/5403; C08K 3/22
USPC ........................................ 174/110; 524/261
See application file for complete search history.

(56) References Cited

U.S. PATENT DOCUMENTS

| 3,646,155 A | 2/1972 | Scott |
|---|---|---|
| 4,117,195 A | 9/1978 | Swarbrick et al. |
| 4,144,202 A | 3/1979 | Ashcraft et al. |
| 4,598,116 A | 7/1986 | Keogh et al. |
| 5,246,783 A | 9/1993 | Spenadel et al. |
| 5,266,627 A | 11/1993 | Meverden et al. |
| 5,272,236 A | 12/1993 | Lai et al. |
| 5,278,272 A | 1/1994 | Lai et al. |
| 5,883,178 A | 3/1999 | Ohimoto et al. |
| 5,986,028 A | 11/1999 | Lai et al. |
| 6,107,413 A | 8/2000 | Mori |
| 6,197,864 B1 * | 3/2001 | Borke ............... C08K 3/22 524/373 |
| 6,496,629 B2 | 12/2002 | Ma et al. |
| 6,714,707 B2 | 3/2004 | Rossi et al. |
| 6,924,031 B2 | 8/2005 | Redondo et al. |
| 2006/0269771 A1 * | 11/2006 | Cogen ............... B82Y 30/00 428/560 |
| 2007/0010615 A1 | 1/2007 | Cogen et al. |

FOREIGN PATENT DOCUMENTS

| CN | 101565525 A | 10/2009 |
|---|---|---|
| DE | 19581920 | 12/2006 |
| EP | 426073 | 5/1991 |
| EP | 1310523 | 5/2003 |
| JP | 09-092055 | 4/1997 |
| JP | 2002-155187 A | 5/2002 |
| KR | 20100044039 | 4/2010 |
| KR | 1020100044039 | * 4/2010 |

OTHER PUBLICATIONS

International Search Report and Written Opinion for PCT App. No. PCT/US2011/036057 mailed on Jul. 27, 2011.
International Report on Patentability for PCT App. No. PCT/US2011/036057 mailed on Sep. 28, 2012.

* cited by examiner

*Primary Examiner* — James J Seidleck
*Assistant Examiner* — Deve E Valdez
(74) *Attorney, Agent, or Firm* — Husch Blackwell LLP

(57) ABSTRACT

Silane-grafted polyolefin composition comprising a brominated, flame retardant additive is prepared by a process comprising the step of contacting within a reaction-extrusion zone operated at grafting conditions:
A. A polyolefin,
B. A hydrolysable unsaturated silane,
C. A free radical generator, and
D. Halogenated polyaryl alkane, e.g., decabromodiphenyl ethane,
such that at least a portion of the hydrolysable unsaturated silane is grafted to the polyolefin. The silane-grafted polyolefin is crosslinked after extrusion from the zone, typically as a wire and cable coating, upon exposure to moisture.

16 Claims, No Drawings

HALOGENATED FLAME RETARDANT SYSTEMS FOR USE IN PRESENCE OF SILANE GRAFTING PROCESS

BACKGROUND OF THE INVENTION

1. Field of the Invention

This invention relates to crosslinked wire and cable products. In one aspect the invention relates to a process for making crosslinked wire and cable products while in another aspect, the invention relates to a process for making crosslinked wire and cable products comprising a brominated flame retardant additive. In yet another aspect the invention relates to a process for making such products in one step.

2. Description of the Related Art

The Monosil process is a well known process (U.S. Pat. No. 4,117,195) for making crosslinked wire and cable products in a single step. In one typical embodiment, the process comprises metering into a screw extrusion machine polymer capable of being crosslinked by the use of hydrolysable unsaturated silane together with compounding ingredients comprising a hydrolysable unsaturated silane, a free-radical generator and a silanol condensation catalyst. These ingredients are blended with the polymer in the barrel of the extruder, and the temperature is raised sufficiently to effect grafting of silane groups to the polymer. The amount of free-radical generator is sufficiently low to limit direct free-radical crosslinking to a level that will not prevent extrusion of the material. The reaction mixture is extruded from the extruder through an extrusion die to form an elongate shaped product, e.g., a wire or cable sheath. While the product begins to experience crosslinking while still in the extruder, the cure is continued and completed outside the extruder by the action of moisture.

While this process is often the lowest cost process for making crosslinked extruded products, it is often difficult to conduct it in the presence of certain additives such as brominated flame retardant additives. If such additives are desired as part of the product, then these products are made in a two-step process (known as the Sioplas process) in which silane-grafted base polymer is prepared prior to the introduction of the brominated additive. This distracts from the process efficiency and thus adds cost to the products.

SUMMARY OF THE INVENTION

In one embodiment the invention is a flame retardant composition comprising:
A. A polyolefin,
B. A hydrolysable unsaturated silane,
C. A free radical generator, and
D. Halogenated polyaryl alkane flame retardant.

In one embodiment the polyolefin is polyethylene, the hydrolysable unsaturated silane is at least one of vinyl trimethoxy silane (VTMS), vinyl triethoxy silane, vinyl triacetoxy silane, and gamma-(meth)acryloxy propyl trimethoxy silane, and the free radical generator is peroxide. In one embodiment the composition further comprises at least one of silane crosslinking catalyst, carbon black, non-halogenated filler, colorant, antioxidant, and metal deactivator.

In one embodiment the invention is a composition comprising:
A. A silane-grafted polyolefin (Si-g-polyolefin), and
B. Halogenated polyaryl alkane flame retardant.

In one embodiment the composition further comprises at least one of silane crosslinking catalyst, carbon black, non-halogenated filler, colorant, antioxidant, and metal deactivator. In one embodiment the Si-g-polyolefin is crosslinked.

In one embodiment the invention is a process for making a Si-g-polyolefin composition comprising a halogenated, flame retardant additive, the process comprising the step of contacting within a reaction zone operated at grafting conditions:
A. A polyolefin,
B. A hydrolysable unsaturated silane,
C. A free radical generator, and
D. Halogenated polyaryl alkane flame retardant, such that at least a portion of the hydrolysable unsaturated silane is grafted to the polyolefin. In one embodiment the reaction zone comprises an extrusion zone. In one embodiment a silane crosslinking catalyst is present in the reaction zone. In one embodiment the process comprises the further step of crosslinking the Si-g-polyolefin by exposure to moisture after the Si-g-polyolefin is extruded from the reaction zone. In one embodiment the Si-g-polyolefin is extruded from the reaction zone as a wire or cable sheath.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of components in the compositions of the invention.

"Wire" and like terms mean a single strand of conductive metal, e.g., copper or aluminum, or a single strand of optical fiber.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Polyethylene", "ethylene polymer" and like terms mean a polymer containing units derived from ethylene. Ethylene polymers typically comprise at least 50 mole percent (mol %) units derived from ethylene.

"Silane-grafted polyolefin" and like terms mean an olefin polymer comprising silane functionality. The silane functionality is the result of grafting hydrolysable unsaturated silane, e.g., a vinyl trialkoxy silane, onto an olefin, e.g., ethylene, polymer backbone as described, for example, in U.S. Pat. No. 3,646,155 or U.S. Pat. No. 6,048,935.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricants, fillers, anti-oxidants and the like.

"Ambient conditions" and like terms mean temperature, pressure and humidity of the surrounding area or environment of an article. The ambient conditions of a typical office building or laboratory include a temperature of 23° C. and atmospheric pressure.

"Grafting conditions" and like terms mean temperature, pressure, humidity, residence time, agitation, etc., that at which a hydrolysable unsaturated silane will graft to a polyolefin when the two are contacted with one another. Grafting conditions can vary with the nature of the silane and polyolefin, and the presence or absence of a catalyst.

"Catalytic amount" means an amount of catalyst necessary to promote the crosslinking of an ethylene-vinylsilane polymer at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to water).

Polyolefin Resin

The polyolefin resins useful in the practice of this invention are thermoplastic, and include both polyolefin homopolymers and interpolymers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The ∀-olefins can also contain a cyclic structure such as cyclohexane or cyclopentane, resulting in an α-olefin, such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the V-olefins described above. Similarly, styrene and its related olefins (for example, V-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The polyolefin resins can also comprise one or more functional groups such as an unsaturated ester or acid, and these polyolefins are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

More specific examples of polyolefins useful in this invention include very low density polyethylene (VLDPE) (e.g., FLEXOMER® ethylene/1-hexene polyethylene made by The Dow Chemical Company), homogeneously branched, linear ethylene/∀-olefin copolymers (e.g. TAFMER® by Mitsui Petrochemicals Company Limited and EXACT® by Exxon Chemical Company), homogeneously branched, substantially linear ethylene/∀-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefins useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic polymers can also be used in this invention, and the olefin polymers can be blended or diluted with one or more other polymers to the extent that, in a preferred mode, the olefin polymers of this invention constitute at least about 50, preferably at least about 75 and more preferably at least about 80, weight percent of the thermoplastic polymer component of the blend. In a less preferred mode and depending on other properties that may be sought, the olefin polymer content may be less than 50% of the thermoplastic polymer component.

The amount of polyolefin in the composition of this invention, i.e., the crosslinked, silane-grafted polyolefin extruded product comprising a halogenated, flame retardant additive, depends in large part on the end use application of the composition. Typically, however, the amount of polyolefin in the composition of this invention is at least 21 weight percent (wt %) based on the weight of the composition. The maximum amount of resin in the composition typically does not exceed 92 wt % based on the weight of the composition.

Hydrolysable Unsaturated Silane

Any silane that will effectively graft to and crosslink an olefin polymer, can be used in the practice of this invention, and those described by the following formula are exemplary:

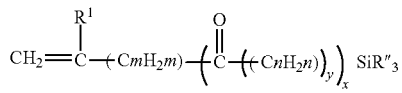

in which $R^1$ is a hydrogen atom or methyl group; x and y are 0 or 1 with the proviso that when x is 1, y is 1; m and n are independently an integer from 1 to 12 inclusive, preferably 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl. Such silanes may be copolymerized with ethylene in a reactor, such as a high pressure process. Such silanes may also be grafted to a suitable ethylene polymer by the use of a suitable quantity of organic peroxide, either before or during a shaping or molding operation. Additional ingredients such as heat and light stabilizers, pigments, etc., also may be included in the formulation. The phase of the process during which the crosslinks are created is commonly referred to as the "cure phase" and the process itself is commonly referred to as "curing". Also included are silanes that add to unsaturation in the polymer via free radical processes such as mercaptopropyl trialkoxysilane.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this invention. If filler is present, then preferably the crosslinker includes vinyl trialkoxy silane.

The amount of silane crosslinker used in the practice of this invention can vary widely depending upon the nature of the polymer, the silane, the processing or reactor conditions, the grafting efficiency, the ultimate application, and similar factors, but typically at least 0.5, more typically at least 0.7, weight percent is used. Considerations of convenience and economy are two of the principal limitations on the maximum amount of silane crosslinker used in the practice of this invention, and typically the maximum amount of silane crosslinker does not exceed 5, more typically it does not exceed 3, weight percent.

Free Radical Generator (Initiator)

The hydrolyzable unsaturated silane is grafted to the polyolefin polymer through the action of a free radical generator or initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.04, preferably at least 0.06, parts per hundred resin (phr). Typically, the initiator does not exceed 0.15, preferably it does not exceed about 0.10, phr. The weight ratio of silane crosslinker to initiator also can vary widely, but the typical crosslinker:initiator weight ratio is between 10:1 to 500:1, preferably between 18:1 and 250:1. As used in parts per hundred resin or phr, "resin" means the olefinic polymer.

Halogenated Polyaryl Alkane

The halogenated polyaryl alkanes are known compounds and many are commercially available. In one embodiment of the invention the alkane component of the halogenated polyaryl alkane, i.e., the alkyl component of the compound, is derived from a linear $C_1$-$C_6$ alkane, typically ethane, propane or butane. In one embodiment the aryl components of the compound are phenyl or naphthyl. In one embodiment the alkyl component of the compound is substituted with 2-4 aryl groups each of which can be the same or different as the other aryl groups. Each aryl group can comprise one or more substituents other than a halogen, e.g., one or more alkyl groups. The halogen component of the compound is typically at least one of fluoride, chloride or bromide, preferably bromide. The compound is typically at least 50% halogenated with the halogen groups attached primarily to the aryl groups but some of which may attach to the alky group to the extent a point of attachment exists on the alkyl group. Representative halogenated polyaryl alkanes include, but are not limited to, decabromodiphenyl ethane (DBDPE), nona-bromodiphenyl ethane and octabromodiphenyl ethane with DBDPE being the preferred halogenated polyaryl alkane.

The amount of halogenated polyaryl alkane in the composition of this invention, i.e., the crosslinked, silane-grafted polyolefin extruded product comprising the halogenated polyaryl alkane, depends in large part, like the amount of polyolefin, on the end use application of the composition. Typically, however, the amount of halogenated polyaryl alkane in the composition is at least 5, more typically at least 8, weight percent (wt %) based on the weight of the composition. The maximum amount of halogenated polyaryl alkane in the composition typically does not exceed 30, more typically does not exceed 20, wt % based on the weight of the composition.

While any conventional method can be used to graft the silane crosslinker to the polyolefin polymer, one preferred method is blending the two with the initiator in the first stage of a reactor extruder, such as a single screw extruder. The grafting conditions can vary, but melt temperatures, e.g., 160 and 260° C., preferably between 190 and 230° C., are typically used depending upon the residence time and the half life of the initiator.

Carbon Black

Those embodiments of the invention in which the composition is black typically comprise carbon black (as opposed to those compositions that are natural in color or comprise a colorant, e.g., a pigment or dye, such compositions typically being void or free of carbon black). Virtually any carbon black can be used in the practice of this invention. Representative examples of carbon black include ASTM grade N110, N121, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. Carbon black also includes furnace black; acetylene black, thermal black, lamp black and Ketjen black. These carbon blacks have iodine absorptions ranging from 9 to 14 g/kg and average pore volumes ranging from 10 to 150 $cm^3/100$ g. In one embodiment the carbon black is N110-type carbon black to achieve good weathering performance in wire and cable jacketing. In one embodiment the carbon black is a medium thermal black that has a larger particle size, e.g., 15-400 nanometers, and a low specific surface area, e.g., an oil absorption number of 30-50 $cm^3/100$ g as measured by ASTM D2414. In one embodiment the carbon black is selected for its flame retardant properties, e.g., medium or large particle size and amorphous structure so as to allow for a high loading without adding significantly to the stiffness of the article made from the composition. In one embodiment the carbon black can be in the form of carbon fibers, carbon nanotubes, fullerene, graphites and expanded graphite platelets.

The carbon black typically comprises at least 20 wt % of the semiconductive shield composition. The carbon black typically comprises not more than 45 wt % of the semiconductive shield composition.

Silane Crosslinking Catalyst

Crosslinking catalysts include the Lewis and Brønsted acids and bases. Lewis acids are chemical species that can accept an electron pair from a Lewis base. Lewis bases are chemical species that can donate an electron pair to a Lewis acid. Lewis acids that can be used in the practice of this invention include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Lewis bases that can be used in the practice of this invention include, but are not limited to, the primary, secondary and tertiary amines. These catalysts are typically used in moisture cure applications.

The minimum amount of crosslinking catalyst used in the practice of this invention is a catalytic amount. Typically this amount is at least 0.01, preferably at least 0.02 and more preferably at least 0.03, weight percent (wt %) of the combined weight of silane-grafted polyolefin resin and catalyst. The only limit on the maximum amount of crosslinking catalyst in the polyolefin resin is that imposed by economics and practicality (e.g., diminishing returns), but typically a general maximum comprises less than 5, preferably less than 3 and more preferably less than 2, wt % of the combined weight of ethylene polymer and condensation catalyst.

The silane crosslinking catalyst is typically added to the reaction-extruder so that it is present during the grafting reaction of silane to polyolefin. As such, the Si-g-polyolefin typically experiences some crosslinking before it leaves the extruder with the completion of the crosslinking after it has left the extruder, typically upon exposure to moisture (e.g., a sauna bath) and/or the humidity present in the environment in which it is stored, transported or used.

Fillers and Additives

The crosslinked, silane-grafted polyolefin extruded product comprising a brominated, flame retardant additive can be filled or unfilled. If filled, then the amount of filler present should preferably not exceed an amount that would cause unacceptably large degradation of the mechanical and/or chemical properties of the silane-crosslinked, olefin polymer. Typically, the amount of filler present is between 2 and 80, preferably between 5 and 70, weight percent (wt %) based on the weight of the polymer. Representative fillers include kaolin clay, magnesium hydroxide, silica, calcium carbonate and carbon blacks. The filler may or may not have flame retardant properties. In a preferred embodiment of this invention in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this invention can also contain additives such as, for example, antioxidants (e.g., hindered phenols such as, for example, IRGANOX® 1010 a registered trademark of Ciba Specialty Chemicals), phosphites (e.g., IRGAFOS® 168 a registered trademark of Ciba Specialty Chemicals), UV stabilizers, cling additives, light stabilizers (such as hindered amines), plasticizers (such as dioctylphthalate or epoxidized soy bean oil), metal deactivators, scorch inhibitors, mold release agents, tackifiers (such as hydrocarbon tackifiers), waxes (such as polyethylene waxes), processing aids (such as oils, organic acids such as stearic acid, metal salts of organic acids), oil extenders (such as paraffin oil and mineral oil), colorants or pigments to the extent that they do not interfere with desired physical or mechanical properties of the compositions of the present invention. These additives are used in amounts known to those versed in the art.

Representative Formulations

The amount of each component in the compositions of this invention will vary with the application to which the composition will be used. In wire and cable applications, for example, the composition formulations will vary according to desired flame retardant performance and if the composition is natural or colored versus black. Representative formulations for horizontal (XHHW, RHW) and vertical (VW-1) burn applications (these tests are described in UL 2556 from Underwriters Laboratories) are reported in Tables 1 and 2 (all amounts are in weight percent based on the total weight of the composition). The flame retardant level is adjusted to meet the requirements of the cable construction and performance, e.g., those specified in the National Electric Code (NFPA publication).

TABLE 1

Horizontal Burn Applications

| Component | Colored/Natural (wt %) | Black (wt %) |
|---|---|---|
| Polyolefin | 63-92 | 42-87 |
| DBDPE | 5-20 | 5-20 |
| Antimony Oxide | 2.5-10 | 2.5-10 |
| Colorant | 0-3 | — |
| Carbon Black | — | 5-20 |
| Peroxide | 0.02-0.2 | 0.02-0.2 |
| Silane | 0.5-3 | 0.5-3 |
| Additives | 0-1 | 0-1 |

TABLE 2

Vertical Burn Applications

| Component | Colored/Natural | Black |
|---|---|---|
| Polyolefin | 48-84 | 21-79 |
| DBDPE | 10-30 | 10-30 |
| Antimony Oxide | 5-15 | 5-15 |
| Colorant | 0-3 | — |
| Carbon Black | — | 5-30 |
| Peroxide | 0.02-0.2 | 0.07-0.2 |
| Silane | 0.5-3 | 0.5-3 |
| Additives | 0-1 | 0-1 |

Compounding/Fabrication

Compounding of the polyolefin resin, hydrolysable unsaturated silane, free radical generator, decabromodiphenyl ethane, silane crosslinking catalyst, optional carbon black, and optional filler and additives can be performed by standard means known to those skilled in the art. Examples of compounding equipment are internal batch mixers, such as a Banbury or Bolling internal mixer. Alternatively, continuous single or twin screw mixer or extruders can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The components of the composition are typically mixed at a temperature and for a length of time sufficient to fully homogenize the mixture but insufficient to cause the material to gel. The catalyst is typically added to silane-grafted olefin polymer but it can be added before, with or after the additives, if any. Typically, the components are mixed together in a melt-mixing device. The mixture is then shaped into the final article. The temperature of compounding and article fabrication should be above the melting point of the silane-grafted olefin polymer but below 250° C.

In some embodiments, either or both of the catalyst and the additives are added as a pre-mixed masterbatch. Such masterbatches are commonly formed by dispersing the catalyst and/or additives into an inert plastic resin, e.g., a low density polyethylene. Masterbatches are conveniently formed by melt compounding methods.

In one embodiment, one or more of the components are dried before compounding, or a mixture of components is dried after compounding, to reduce or eliminate potential scorch that may be caused from moisture present in or associated with the component, e.g., filler. In one embodiment, crosslinkable silicone-modified polyolefin mixtures are prepared in the absence of a crosslinking catalyst for extended shelf life, and the crosslinking catalyst is added as a final step in the preparation of a melt-shaped article.

Articles of Manufacture

In one embodiment, the composition of this invention can be applied to a cable as a sheath or insulation layer in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. Cure may begin in the reactor-extruder.

While not necessary or preferred, the shaped article can be exposed to either or both elevated temperature and external moisture and if an elevated temperature, it is typically between ambient and up to but below the melting point of the polymer for a period of time such that the article reaches a desired degree of crosslinking. The temperature of any post-shaping cure should be above 0° C.

Other articles of manufacture that can be prepared from the polymer compositions of this invention include fibers, ribbons, sheets, tapes, tubes, pipes, weather-stripping, seals, gaskets, hoses, foams, footwear and bellows. These articles can be manufactured using known equipment and techniques.

The invention is described more fully through the following examples. Unless otherwise noted, all parts and percentages are by weight.

Specific Embodiments

The tendency for additives to interfere with grafting processes is quantified by the yield of crosslinking of polyethylene that could be generated as measured by the maximum torque generated (MH) in experiments conducted at 182° C. on an MDR according to ASTM D5289. The base material is prepared using a BRABENDER™ mixer to combine an LLDPE (DFDA-7530) with carbon black or flame retardant masterbatches and/or an acid scavenging antioxidant (Chimassorb 944). After the base resin is prepared, 2% by weight of dicumyl peroxide is soaked into the compound and the MH is determined on it using an MDR at 182° C. BRABENDER™ mixing is for 5 minutes at 155° C. No additional melt mixing is completed after soaking in the peroxide.

The data in Table 3 shows that the MH generated for the LLDPE (Sample 1) alone was 9.4. Addition of a carbon black masterbatch to achieve the desired 2.5% level needed for UV stability results in some loss of reaction efficiency where the MH (Sample 2) falls to 8.5. Since Sample #2 is typical of formulations used to produce low voltage (LV)

utility wire in Monosil applications, the target MH value of 8.5 is representative of the desired target value needed to achieve efficient grafting reaction.

Sample 3 illustrates the issue of using the traditional brominated flame retardant (decabromodiphenyl oxide, DBDPO) in the presence of grafting operations. The MH for this sample (4.8) is nearly half that of desired value of 8.5. Surprisingly however, when replacing the brominated flame retardant with decabromodiphenyl ethane (DBDPE), a MH of 7.7 is achieved for Sample #4. This demonstrates that DBDPE has only 20% the interference in radical initiated reactions of DBDPO.

Since flame retardance can be achieved by using a combination of additives, experiments are also run on systems whose flame retardant (FR) performance is achieved by a combination of brominated flame retardants and carbon black in order to identify further improved systems. Sample #5 shows that the use of a flame retardant composition that is primarily carbon black based and uses only 20% of the brominated flame retardant as Sample #2 has an MH of 7.8. This demonstrates that the use of carbon black in place of a proportion of brominated flame retardant is beneficial to producing a compound that can be used in a grafting process. Sample #6 further demonstrates that the use of DBDPE in combination with a carbon black flame retardant has superior performance to either Systems #4 or #5 having an MH of 8.6. This demonstrates that Sample #6 achieves the most desired performance with equivalence to System #2.

Residual acidic species can degrade peroxide compounds leading to low yields of peroxide efficiency. Therefore, since brominated flame retardants can contain or generate acidic species (e.g. HBr) an evaluation is performed to identify if this is a cause of the effect demonstrated above. In order to do this a 0.2 wt % of a basic antioxidant (CHIMASSORB™ 944) is added to similar systems as those evaluated above. Sample #1A shows that this antioxidant does not have an impact on the MH of LLDPE alone, having an equivalent MH of 9.4 to Sample #1. Meanwhile, Samples 3A, 4A, 5A and 6A all had 1.5 increases in MH from their counterparts that did not contain CHIMASSORB 944. Since these samples contained different brominated flame retardant additives used at different levels, the presence of acid residual or acid generated from thermal decomposition of the brominated flame retardant is not the source of improved performance of the DBDPE to the DBDPO. Additionally, the use of an amine-based antioxidant in these flame retardant compositions will yield higher radical efficiency. As this antioxidant effect is independent to the preference of flame retardant disclosed, this is not a necessary component to this invention.

Samples 1 (Comparative): No additives to affect peroxide response.

1A (Comparative): No impact of CHIMASSORB™ 944 on MH vs. Sample 1 in the absence of other additives.

2 (Comparative): Impact of carbon black.

3 (Comparative): Impact of DBDPO, shows the defect vs. Samples 1, 1A and 2.

3A (Comparative): Shows that CHIMASSORB™ 944 improves the performance of Sample 3.

4 (Inventive): Shows the DBDPE improvement over Sample 3 with an MH value more in line with Samples 1 and 2.

4A (Inventive): Shows that CHIMASSORB™ 944 can also be used with Sample 4 to gain combined improvement.

5 (Comparative): Impact of DBDPO at low levels is proportional to its usage vs. Sample 3.

5A (Comparative): Shows that CHIMASSORB™ 944 can be also be used with Sample 5 to gain improvement.

6 (Inventive): Shows the DBDPE improvement over Sample 5 even when lower levels are used.

6A (Inventive): Shows that CHIMASSORB™ 944 can also be used with Sample 6 to gain improvement.

Materials

DFDA-7530: 0.70 MI, 0.92 g/cc LLDPE produced by the UNIPOL™ PE process from The Dow Chemical Company.

Carbon black masterbatch: 1.15 g/cc LLDPE based masterbatch containing 40% by weight of a fine particle size (20 micron average) carbon black.

DBDPO masterbatch #1: EEA (15% EA, 1.3 MI) based masterbatch containing 45% DBDPO and 15% antimony oxide.

DBDPE masterbatch #2: EEA (15% EA, 1.3 MI) based masterbatch containing 45% DBDPE and 15% antimony oxide.

DBDPO/CB masterbatch #3: DMA-7530 based masterbatch containing 40% of a medium thermal carbon black (N990), 8% of DBDPO and 3% of antimony oxide.

DBDPE/CB masterbatch #4: DMA-7530 based masterbatch containing 40% of a medium thermal carbon black (N990), 8% of DBDPE and 3% of antimony oxide.

CHIMASSORB™ 944: BASF, CAS#71878-19-8, Poly [(6-[(1,1,3,3-tetramethylbuty)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

DBDPO: Decabromodiphenyl oxide, CAS#1163-19-5, DE-83R from Chemtura.

DBDPE: Decabromodiphenyl ether, CAS#84852-53-9, Saytex 8010 from Albemarle.

Antimony Oxide: Microfine AO9, CAS#1309-64-4 burn synergist from Chemtura.

TABLE 3

Sample Composition and Sample Cure Data

| Base Material | 1 | 2 | 3 | 4 | 5 | 6 | 1A | 3A | 4A | 5A | 6A |
|---|---|---|---|---|---|---|---|---|---|---|---|
| DFDA-7530 | 100 | 93.7 | 75 | 75 | 65 | 65 | 99.8 | 74.8 | 74.8 | 64.8 | 64.8 |
| Carbon black masterbatch | | 6.3 | | | | | | | | | |
| DBDPO masterbatch #1 | | | 25 | | | | | 25 | | | |
| DBDPE masterbatch #2 | | | | 25 | | | | | 25 | | |
| DBDPO/CB masterbatch #3 | | | | | 35 | | | | | 35 | |
| DBDPE/CB masterbatch #4 | | | | | | 35 | | | | | 35 |
| CHIMASSORB 944 | | | | | | | 0.2 | 0.2 | 0.2 | 0.2 | 0.2 |
| Dicumyl peroxide soaked into base resin | 2% | 2% | 2% | 2% | 2% | 2% | 2% | 2% | 2% | 2% | 2% |
| MH (MDR 182C) | 9.4 | 8.5 | 4.8 | 7.7 | 7.8 | 8.6 | 9.4 | 6.2 | 9.2 | 9.7 | 10.0 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A one-part composition comprising a blend of:
    21 to 92 weight percent (wt %) of a polyethylene other than a polyethylene comprising silane functionality;
    0.5 to 5 wt % of a hydrolysable unsaturated silane that will graft to and crosslink the polyethylene, the hydrolysable unsaturated silane elected from the group consisting of vinyl trimethoxy silane (VTMS), vinyl triethoxy silane, vinyl triacetoxy silane, and gamma-(meth)acryloxy propyl trimethoxy silane;
    0.02 to 0.2 wt % of a free radical generator;
    2.8 to 30 wt % decabromodiphenyl ethane (DBDPE);
    5 to 30 wt % carbon black; and
    0.01 to 5 wt % of a silane crosslinking catalyst;
    the wt % based on the total weight of the composition.

2. A composition of claim 1, comprising 42 to 87 wt % of the polyethylene.

3. A composition of claim 1, comprising 21 to 79 wt % of the polyethylene.

4. The composition of claim 1, wherein the polyethylene comprises at least one of a polyethylene homopolymer and an ethylene/α-olefin interpolymer.

5. The composition of claim 1, wherein the polyethylene comprises a linear ethylene copolymer.

6. The composition of claim 1, further comprising antimony oxide.

7. The composition of claim 1, comprising 1-15 wt % antimony oxide.

8. The composition of claim 1, further comprising at least one of a filler and an additive.

9. The composition of claim 8, comprising a non-halogenated filler.

10. The composition of claim 8, wherein the filler is selected from the group consisting of kaolin clay, magnesium hydroxide, silica, and calcium carbonate.

11. The composition of claim 8, comprising an additive selected from the group consisting of lubricants, antioxidants, phosphites, UV stabilizers, cling additives, light stabilizers, plasticizers, metal deactivators, scorch inhibitors, mold release agents, tackifiers, waxes, processing aids, oil extenders, colorants and pigments.

12. The composition of claim 8, comprising a brominated, flame retardant additive.

13. A process for preparing a Si-g-polyethylene composition, the process comprising:
    contacting the composition of claim 1 within a reaction zone operated at grafting conditions, such that at least a portion of the hydrolysable unsaturated silane is grafted to the polyethylene.

14. The process of claim 13, in which the reaction zone comprises an extrusion zone.

15. The process of claim 14, in which the silane crosslinking catalyst is present in the reaction zone and the extrusion zone.

16. The process of claim 13, further comprising crosslinking the Si-g-polyethylene after the composition is removed from the extrusion zone.

* * * * *